April 13, 1948.  A. M. GOODLOE ET AL  2,439,424
METHOD OF PRODUCING COMPRESSED WIRE UNITS
Filed Jan. 16, 1945  2 Sheets-Sheet 1
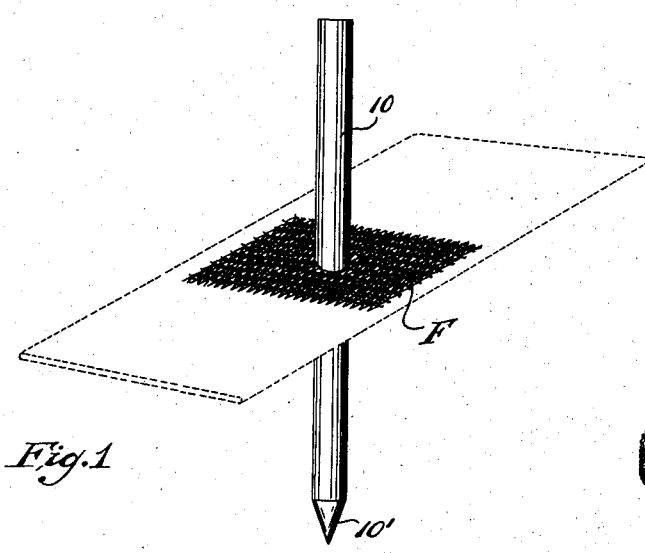
Fig.1
Fig.9
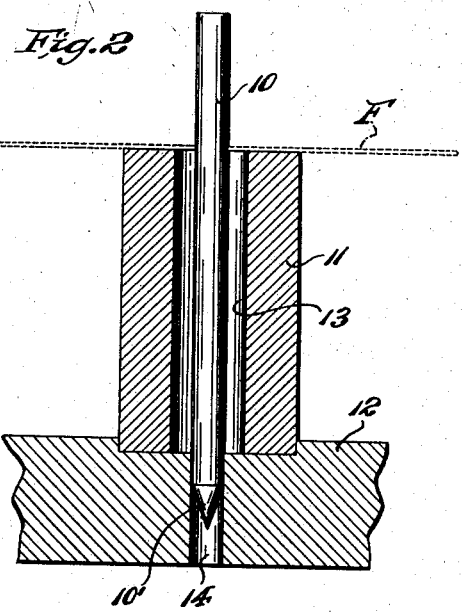
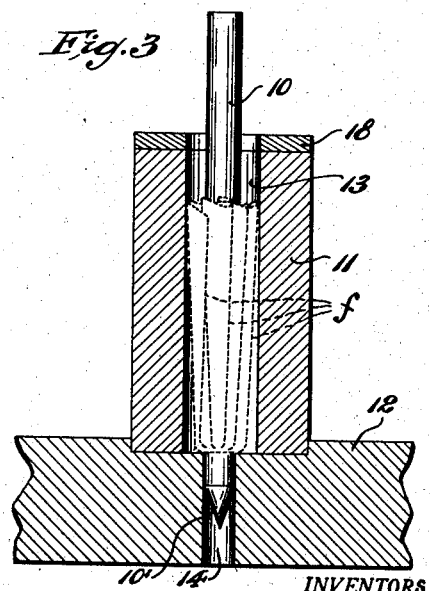
INVENTORS:
Alfred M. Goodloe & Otto H. York,
BY
George D. Richards
Attorney

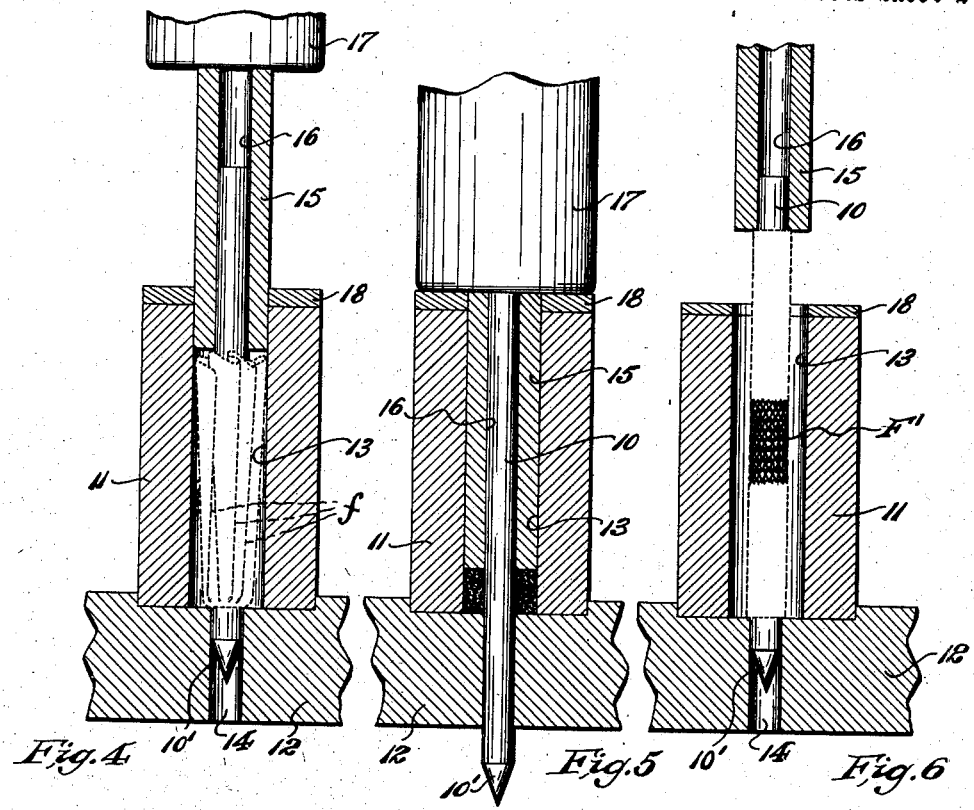
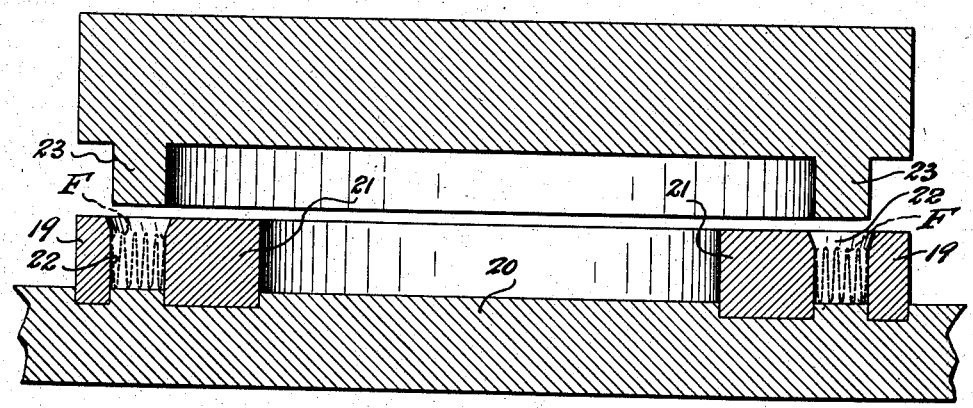
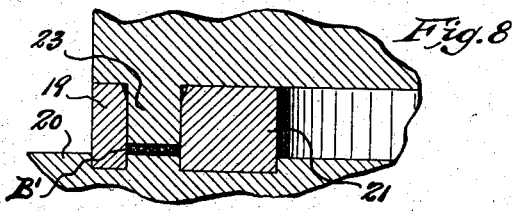

Patented Apr. 13, 1948

2,439,424

UNITED STATES PATENT OFFICE 2,439,424

METHOD OF PRODUCING COMPRESSED WIRE UNITS

Alfred M. Goodloe, Montclair, and Otto H. York, Maplewood, N. J., assignors to Metal Textile Corporation, West Orange, N. J., a corporation of Delaware Application January 16, 1945, Serial No. 573,096

1 Claim. (Cl. 140—71)

This invention relates to the method of making a compressed wire mesh unit.

This invention has for an object to provide a novel compact, resilient, and, where such quality is of use, pervious or porous, perforate body produced from wire mesh fabric and preferably from a knitted wire mesh fabric, which, after being suitably arranged in relation to a forming mandrel, is subjected to a shaping operation whereby the same is collapsed upon itself in a suitable forming mold and compressed therein, so as to interentangle and mutually interlock the folds, plies and mesh wires thereof between the mandrel and mold walls, thus producing a self form sustaining perforate unitary mass of desired density and elastic compressibility; the perforate compressed wire mesh body thus resulting being adapted for various uses, but being especially well adapted for use as a resilient washer, gasket body, bearing body, or the like.

This invention also has for an object to further improve and adapt the general method of producing compressed wire mesh units disclosed in copending application for United States Letters Patent Ser. No. 567,892, filed Dec. 12, 1944, for the producing of perforate or annular compressed wire mesh bodies or units.

Other objects of this invention, not at this time more particularly enumerated, will be understood from the following detailed description of the same.

The accompanying drawings show an illustrative embodiment of the novel perforate compressed wire mesh body or unit, including various method steps employed in producing the same. In said drawings:

Fig. 1 is a perspective view of knitted wire mesh material pierced by a forming mandrel preparatory to molding thereof into a perforate compressed wire body or unit; Fig. 2 shows the assembled wire mesh fabric and mandrel as initially applied to a forming mold, the latter being shown in cross section; Fig. 3 is a sectional view of the mold with the material and mandrel entered therein preparatory to the compressing operation; Fig. 4 is a similar view, showing the initiation of the compressing operation; and Fig. 5 is a similar view showing the completion of the compressing operation.

Fig. 6 is a sectional view of the mold with the material and mandrel entered therein preparatory to the compressing operation, but showing another method of assembling the material with the mandrel.

Fig. 7 is a sectional view of a larger size mold and mandrel ring and cooperating compression plunger means with the material deposited in the mold preparatory to the compressing operation, and Fig. 8 is a similar but fragmentary sectional view showing the completion of the molding operation.

Fig. 9 is a perspective view of a perforate compressed wire mesh body or unit made according to this invention.

Similar characters of reference are employed in the hereinabove described views, to indicate corresponding parts.

The perforate compressed wire mesh body or unit, especially to obtain comparatively small sizes thereof, is produced substantially as follows:

A suitable length and width of preferably knitted metallic mesh fabric F is provided. Such fabric may be knitted from round or flat wire of selected gauge and of desired metal. The fabric may be either flat or tubular knit, but preferably the latter; and may be of selected mesh loop size.

The mesh fabric F is first assembled with a forming mandrel 10. One manner of assembling the mesh fabric with the mandrel 10 (as shown in Fig. 1) is to cause the latter to pierce the fabric so as to extend through a substantially central portion thereof. One end of the mandrel may be pointed as at 10' to facilitate this operation. When the fabric and mandrel have been assembled, the mandrel is entered in a suitable molding means for controlling the ultimate external shape and form of the perforate compressed wire mesh body or unit desired to be obtained. Said molding means comprises an upwardly open and bottom closed mold block 11 suitably mounted on a base 12 whereby to provide a mold cavity 13 of selected cross sectional shape and size. The mandrel 10 is entered in the mold cavity 13 so as to extend axially therethrough, and the mold base 12 is preferably provided with an opening 14 sized to fit and receive the inner or lower end of the mandrel, whereby to maintain the latter in desired spaced relation to the side walls of the mold cavity 13 (see Fig. 2). When the mandrel 10 is thus assembled with the molding means, the fabric body F is, by suitable instrumentalities, thrust downwardly into the interior of the mold cavity 13. As the fabric is thus moved into the mold cavity, those portions of the fabric body extending from the mandrel 10 are, by engagement with the side walls of said mold cavity and between the same and said mandrel, not only upturned about the mandrel, but are at the same time formed into a plurality of longitudinal folds or pleats *f*, whereby the fabric body is disposed to produce an initial formation of generally tubular shape, adapted to occupy the mold cavity space between the side walls thereof and the inserted mandrel (see Fig. 3).

The fabric body F having been thus deposited in the described prefolded formation within the mold cavity 13 and around the mandrel 10, a compression plunger 15 of tubular form is aligned with the mold cavity and mandrel, which, when operated, may enter through the upper open end of the mold cavity for downward movement into said cavity. Said compression plunger 15 is of external shape and size to conform to the cross-sectional shape of the mold cavity, and is provided with an axial bore 16 sized to slidingly fit over the mandrel 10 (see Fig. 4).

A suitably driven driving plunger 17 or equivalent means is applied to the compression plunger 15 for causing the same to descend into the mold cavity and to thereupon exert a desired magnitude of compression pressure upon the fabric formation occupying the mold cavity, whereby to form the perforate compressed wire mesh body or unit sought to be obtained (see Figs. 4 and 5). Said driving plunger 17 may be actuated by any suitable power transmission means; e. g. it may be hydraulically operated.

As the compression plunger 15 descends the mold cavity 13, it engages the wire mesh fabric formation which surrounds the mandrel 10 so as to exert thereupon an endwise applied collapsing and crushing pressure of selected magnitude. Under the thus applied compressive and crushing force, the longitudinal folds and included contiguous plies of the wire mesh fabric are zigzagged into laterally extending, interentangled, and mutually interlocked additional folds, the wire mesh loops of which are also interengaged and entangled, until at the end of the operative stroke of the compression plunger, the initial fabric body has been crushed down and compressed into a completed self form sustaining, centrally open or perforate body or unit B having a mass of substantial density, according to the degree of compacting force applied thereto by the compression plunger (see Fig. 5).

After the perforate body or unit B has been produced, and the compression plunger 15 has been withdrawn, the mandrel 10 may thereupon be likewise withdrawn, and then the body or unit B removed from the mold cavity in any suitable way.

Alternative to the above and perhaps preferred manner of initially assembling wire mesh fabric F with the forming mandrel 10, there is shown in Fig. 6 of the drawing another way of initially relating tubular knitted wire mesh fabric to the mandrel 10 preparatory to compressing said fabric in the mold cavity. To this end a tubular knit sleeve F' of wire mesh fabric is telescoped onto the mandrel 10, and then the latter, with the fabric thus assembled therewith, is entered and fixed in axial extension through the mold cavity 13, similarly as above described. With tubular knit wire mesh fabric F' thus related to the mandrel 10, when the compression plunger 15 is caused to engage over the mandrel and descend the interior of the mold cavity 13, the lower end of the compression plunger 15 will engage the top extremity of the fabric tube F', while the bottom extremity of the latter abuts and is stopped against the bottom of said mold cavity, whereby the tubular fabric will be collapsed and zigzagged into laterally extending interentangled, and mutually interlocked folds, the wire mesh loops of which are also interengaged and entangled, until at the end of the operative stroke of said compression plunger, the fabric will have been crushed down and compressed into a completed self form sustaining, centrally open or perforate body or unit B.

By the above described operations, perforate bodies or units of comparatively small size can be easily and rapidly produced, which are suitable for use as compressible washers, bearing members or bushings and for various other purposes. The perforate bodies or units may be given a desired degree density according to the amount of compacting force applied thereto in the production thereof. The mass of the compressed wire mesh bodies or units will be more or less porous, and consequently will be pervious to penetration by oil or other like liquids; thus providing a valuable characteristic when used as bearing members or bushings desired to be lubricated.

The axial dimensions of the perforate body or unit produced as above described may be generally controlled by two factors, (1) the amount of metallic mesh fabric employed and (2) the limitation of the operative stroke of the compression plunger 15. It will also be understood that the density of the perforate body or unit may be controlled by predetermining the amount of metallic mesh fabric relative to a given operative stroke of the compression plunger. Limitation of the operative stroke of the compression plunger may be variously effected, but a very satisfactory means for so doing, within limits, is too apply to the top end of the mold block 11, stop washers 18 of selected thickness (see Figs. 3 to 6 inclusive).

It will be understood that the size of the perforate body or unit, as to external and internal measurements, will be governed by the size of the molding means; which latter means may be variously sized and shaped to correspond to a selected size and shape of perforate body or unit desired to be produced. For example, a perforate body of comparatively large external and internal dimensions, and of desired thickness, suitable, for instance, to be used as a gasket member, may be required. In such case the molding means may be suitably modified to produce the same, as shown e. g. in Figs. 7 and 8, wherein a mold block or ring 19 of suitable internal diameter is mounted on a base block 20, and a mandrel ring 21 of suitable external diameter is also mounted on said base block 20 so as to cooperate with the mold block or ring 19 in forming a mold cavity 22 of desired external and internal dimensions. A suitable compression plunger means 23, sized to fit and enter the mold cavity 22 is provided. The metallic mesh fabric F is suitably folded upon itself and deposited in the mold cavity 22 so as to fill the same (see Fig. 7). When the compression plunger means 23 is caused to descend into the mold cavity 22 the fabric F is compressed and formed into the resultant large size perforate body or unit B' (see Fig. 8).

Having now described our invention, we claim:

The method of producing a perforate compressed wire mesh body of the kind and for the purposes described comprising piercing a flat extent of knitted wire mesh fabric by a mandrel sized to determine the internal dimension of the body so that said mandrel extends substantially centrally through the fabric and perpendicular to the plane thereof, disposing the mandrel to extend axially through and in spaced relation to the sides of the cavity of a mold sized to determine the external dimension of the body, then folding the fabric about the mandrel to provide contiguous laterally lapping folds and plies substantially parallel to the mandrel axis, such folded formation being disposed in the mold cavity within the space between the mandrel and the cavity sides, and then axially compressing said folded formation within the mold cavity between the sides thereof and said mandrel, under pressure of selected magnitude, whereby to longitudinally collapse the fabric folds and plies upon themselves so that the same and the wires thereof are interentangled and interlocked to thereby consolidate the same into a substantially dense self form sustaining perforate body mass.

ALFRED M. GOODLOE.
OTTO H. YORK.

REFERENCES CITED

The following references are of record in the file of this patent:

UNITED STATES PATENTS

| Number | Name | Date |
|---|---|---|
| 338,358 | Pratt | Mar. 23, 1886 |
| 1,991,023 | Mayer | Feb. 12, 1935 |
| 1,991,024 | Mayer | Feb. 12, 1935 |
| 1,995,808 | Homon | Mar. 26, 1935 |
| 1,995,809 | Homon | Mar. 26, 1935 |
| 2,242,326 | Rosenthal | May 20, 1941 |
| 2,251,211 | Armstrong | July 29, 1941 |
| 2,327,326 | Loeffler | May 20, 1941 |
| 2,334,263 | Hartwell | Nov. 16, 1943 |